United States Patent
Bergmeier et al.

(10) Patent No.: US 7,967,305 B2
(45) Date of Patent: Jun. 28, 2011

(54) VEHICLE, IN PARTICULAR AN INDUSTRIAL TRUCK, HAVING A FIXING ARRANGEMENT FOR A WHEEL

(75) Inventors: Stefan Bergmeier, Langenpreising (DE); Carsten Schöttke, Moosburg (DE)

(73) Assignee: Jungheinrich AG, Hamburg (DE)

(*) Notice: Subject to any disclaimer, the term of this patent is extended or adjusted under 35 U.S.C. 154(b) by 214 days.

(21) Appl. No.: 12/353,462

(22) Filed: Jan. 14, 2009

(65) Prior Publication Data

US 2009/0179482 A1 Jul. 16, 2009

(30) Foreign Application Priority Data

Jan. 14, 2008 (DE) .................. 10 2008 004 270

(51) Int. Cl.
*B60G 9/00* (2006.01)
(52) U.S. Cl. ........... 280/124.1; 280/79.11; 280/124.125; 301/117
(58) Field of Classification Search .............. 280/124.1, 280/124.125, 124.11, 79.11; 16/45, 46, 31; 301/111.05, 111.06, 111.01, 114, 117; 105/180, 105/181, 170
See application file for complete search history.

(56) References Cited

U.S. PATENT DOCUMENTS

| | | | | |
|---|---|---|---|---|
| 636,876 A * | 11/1899 | Wells et al. | | 384/290 |
| 1,464,922 A * | 8/1923 | Close | | 295/44 |
| 2,285,656 A | 6/1942 | Herold | | |
| 3,015,838 A | 1/1962 | Ulinski | | |
| 4,354,711 A * | 10/1982 | Main | | 301/35.63 |
| 4,919,491 A * | 4/1990 | Heideman | | 301/126 |
| 5,012,575 A * | 5/1991 | Heideman | | 29/894.3 |
| 5,042,882 A * | 8/1991 | Kuhn et al. | | 301/124.1 |
| 6,425,161 B1 * | 7/2002 | LeMeur et al. | | 16/44 |
| 6,702,350 B1 * | 3/2004 | Gorniak | | 295/43 |
| 7,661,255 B2 * | 2/2010 | Burns | | 56/16.7 |

FOREIGN PATENT DOCUMENTS

| | | |
|---|---|---|
| DE | 4309561 A1 | 9/1994 |
| DE | 94 12 537.6 U1 | 11/1994 |
| EP | 0743199 A1 | 11/1996 |

\* cited by examiner

*Primary Examiner* — Paul N Dickson
*Assistant Examiner* — Drew Brown
(74) *Attorney, Agent, or Firm* — Rothwell, Figg, Ernst & Manbeck, P.C.

(57) ABSTRACT

Vehicle having at least one non-driven wheel which, between outer and inner frame sections of the vehicle, can rotate about an axle arranged to be fixed against rotation and axially non-displaceable with respect to the frame sections, and the wheel having a wheel bearing arrangement which is arranged substantially without free play on the axle in such a way that the wheel is arranged with a respective spacing in the axial direction from the frame sections, the wheel bearing arrangement being clamped in between a radial projection formed at one end of the axle and a fixing arrangement fitted to the other end of the axle and comprising a bush arranged concentrically around the other end of the axle, and the axle being held non-displaceably in the axial direction with respect to the frame sections by means of the bush, the wheel bearing arrangement and the radial projection.

21 Claims, 7 Drawing Sheets

VEHICLE, IN PARTICULAR AN INDUSTRIAL TRUCK, HAVING A FIXING ARRANGEMENT FOR A WHEEL

The present invention relates to a vehicle, in particular an industrial truck, having at least one non-driven wheel which, between an outer and an inner frame section of the vehicle, can rotate about an axle supported with respect to these frame sections, the axle being arranged to be fixed against rotation and axially non-displaceable with respect to the frame sections, and the wheel having a wheel bearing arrangement which is arranged substantially without free play on the axle in such a way that the wheel is arranged with a respective spacing in the axial direction from the frame sections, the wheel bearing arrangement being clamped in between a radial projection formed at one end of the axle and a fixing arrangement fitted to the other end of the axle.

The fixing of non-driven wheels to vehicles can be carried out in different ways. One possibility is to hold the wheel by means of a plug-in axle which, on both sides, is mounted radially in appropriate receiving holes. In addition, axial fixing of the axle is required. According to one known embodiment, the axle is connected to the vehicle frame at one end with the aid of a sheet metal part by means of three screws. Such a connection prevents both the rotation of the axle and also the axial movement of the axle. However, the play-free or low-play fixing of the wheel on the axle which is likewise required is implemented by compensating washers, which are complicated to mount and which have to be arranged on the axle in the axial direction on both sides of the wheel.

The object of the invention is to simplify the mounting of an axle with wheel on a vehicle, in particular an industrial truck.

In the case of a vehicle in which the wheel bearing arrangement is clamped in between a radial projection formed at one end of the axle and a fixing arrangement fitted to the other end of the axle, in order to achieve the object the invention proposes that the fixing arrangement comprise a bush arranged concentrically around the other end of the axle, the axle being held non-displaceably in the axial direction with respect to the frame sections by means of the bush, the wheel bearing arrangement and the radial projection.

The wheel bearing arrangement is in this case in particular in direct contact with the radial projection formed on the axle and a radial annular face of the bush that faces the wheel, so that, as the wheel is fitted to the vehicle, no compensating washers resting directly on the wheel arrangement of the wheel have to be incorporated, which simplifies mounting and leads to a saving in time.

In order that the bush touches only an inner bearing shell of the wheel bearing arrangement, which shell rests on the axle and is stationary as the wheel rotates on the axle, it is proposed that the bush have a conical section which, for the purpose of axial support of the wheel bearing arrangement, passes through an opening in the frame section, and that, moreover, the bush be supported axially on the frame section.

In this case, it is preferred for the bush to be connected firmly to the frame section, preferably welded to the latter. In this way, the bush is secured against axial and rotary movements. Of course, the bush can also be screwed to the frame section or fixed to the latter in another suitable way.

Preferably, in the region of the other end of the axle, on the bush side, the bush has a step-like radial widening, in such a way that, in the region of the widening, between the outer circumference of the axle and the inner circumference of the bush, a substantially annular holder is formed. To this end, it is further proposed that the bush have at least one recess formed radially on the outside on the inner circumference in the region of the widening, and that, moreover, at its end on the bush side, the axle have at least one flattened, preferably flat, outer circumferential section.

The annular holder formed between the outer circumference of the axle and the inner circumference of the bush in the region of the widening thus has an internal and external contour differing from a circle, the recess formed in the bush and the flattened outer circumferential section of the axle preferably facing each other in the radial direction.

The flattened outer circumferential section of the axle is formed in the axial direction such that it is located substantially only in the region of the widening of the bush, so that, in the axial direction away from the bush towards the wheel, the axle has a circular outer contour.

For the purpose of matching the low-play or play-free fixing of the wheel, the fixing arrangement preferably has at least one disc-like ring element which is complementary to the inner circumference of the bush and to the outer circumference of the axle and which is inserted into the annular holder. In this case, it is proposed in particular that the ring element have at least one radial projection on its outer circumference, which is in engagement with the at least one radial recess on the inner circumference of the bush, and that it have on its inner circumference a flattened anti-rotation section, which rests on the flattened, preferably flat, outer circumferential section of the axle.

The ring element thus constitutes a rotationally fixed connection between the axle and the bush, since a rotary movement of the axle is supported via the flattened outer circumferential section, the flattened anti-rotation section of the ring element, the radial projection of the ring element and the radial recess in the bush. A plurality of ring elements can be inserted into the annular holder formed between axle and bush, so that, if appropriate, fabrication tolerances of the various components can be compensated for as the wheel is mounted on the vehicle. In this case, compensation for play is provided by means of the ring elements only at one end of the axle and outside the interspace into which the wheel is inserted between the frame sections. Thus, the introduction of the ring elements is displaced into an easily accessible region and, as a result, the mounting is simplified.

In order to produce the clamping of the wheel bearing arrangement between the radial projection formed on the axle and the bush, it is proposed that the bush and the axle be fixed to each other by means of a screw connection belonging to the fixing arrangement. In this case, it is particularly preferred for the screw connection to comprise a screw connecting the axle to the bush and the at least one ring element, which is inserted into a preferably concentric axial hole at the bush-side end of the axle. In this case, the axial hole generally comprises an internal thread, into which the screw can be screwed. However, it is also conceivable for a preferably concentrically formed bolt with an external thread to be provided on the axle and for the bush to be screwed to this bolt by means of a nut.

For an optimal clamping action of the screw connection, it is proposed that the fixing arrangement comprise a thrust washer which is arranged axially between the bush and the screw head of the screw and which provides the axial support of the at least one ring element. In this case, the thrust washer in one case exerts a certain axial force both on the bush-side end face of the axle and on a ring element arranged flush with this end face. In another case, the thrust washer is in contact only with a ring element projecting somewhat beyond the bush-side end face of the axle in the axial direction, without the axial non-displaceability of the axle being impaired thereby, since the axle is axially fixed by way of the form fit comprising the screw, thrust washer, ring element and bush fixed to the frame section.

The axle is preferably held with its radial projection in a corresponding opening in one of the frame sections, the axial extent of the projection being chosen in such a way that it is greater than the axial thickness of the relevant frame section in which the projection is held. In this way, the wheel is supported on the radial projection of the axle at a distance from the relevant frame section.

The radial projection can be substantially flush with the outer side of the relevant, preferably outer, frame section facing away from the wheel, so that the outer frame section and an outer end of the axle or of the radial projection together form a smooth external contour of the vehicle.

The wheel bearing arrangement preferably comprises a first wheel bearing resting on the radial projection of the axle and a second wheel bearing resting on the bush, between which in the axial direction there is arranged a concentric spacer bush. In this case, the two wheel bearings are preferably constructed as ball bearings, which in each case have an inner bearing shell mounted so as to be fixed against rotation with respect to the axle and an outer bearing shell which can rotate with respect to the axle. The spacer bush extends in the axial direction between the two inner bearing shells, so that the axial forces occurring as the wheel bearing arrangement is clamped between the radial projection of the axle and the bush can be absorbed by the wheel bearing arrangement.

According to a further aspect, the invention relates to a fixing arrangement for a non-driven wheel on a vehicle, preferably an industrial truck, the fixing arrangement comprising an axle which can be introduced into a wheel bearing arrangement of the wheel and fixing means by means of which the axle is fixed to the vehicle so that it is axially non-displaceable, the fixing means having a bush that can be plugged onto one end of the axle and at least one ring element, which can be introduced into a holder formed between the outer circumference of the axle and the inner circumference of the bush in the region of the relevant axle end. The fixing arrangement preferably comprises at least one further feature already described above for the vehicle which refers to the axle and/or the fixing arrangement.

The invention will be described below with reference to the figures and by using an exemplary, non-restricting, embodiment.

Figure 1:
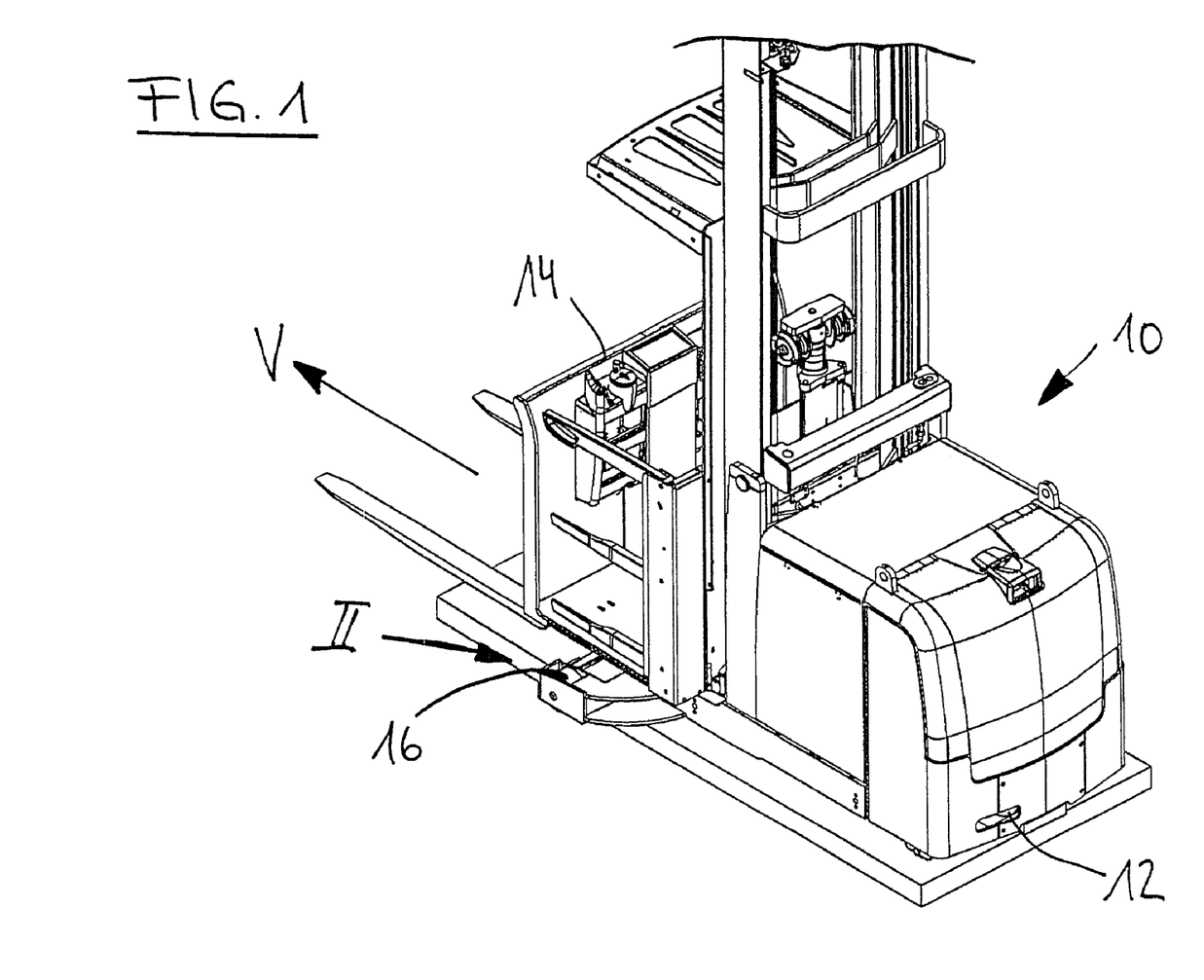
FIG. 1 is a perspective illustration of an industrial truck obliquely from above.

In FIG. 1 an industrial truck is illustrated in the form of an order picking truck 10 which, in its rear region, comprises a central steerable drive wheel 12. Underneath and to the side of a driver's cab 14, the industrial truck 10 has non-driven running rollers 16, of which only the left-hand wheel in relation to a direction of forward travel V is illustrated in FIG. 1.

Figure 2:
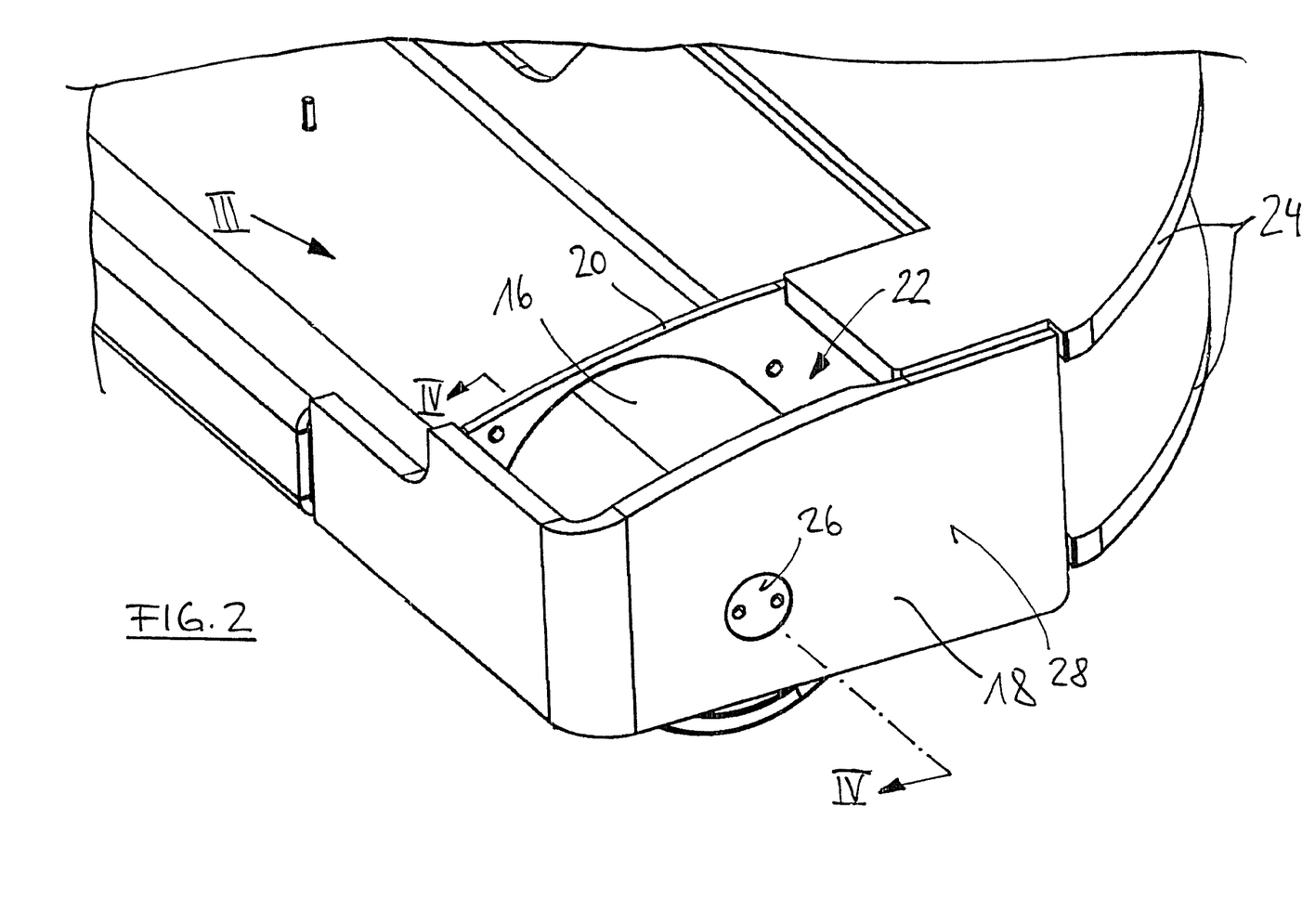
FIG. 2 is an enlarged perspective partial view of a front left wheel of the industrial truck from FIG. 1 from the outside.

FIG. 2 shows an enlarged illustration of the wheel 16 corresponding to the arrow II in FIG. 1. From this schematic perspective view, it can be seen that the wheel 16 is accommodated between an outer frame section 18 and an inner frame section 20, an interspace 22 being formed between the two frame sections 18, 20. The two frame sections 18, 20 are connected in their rear region to further vehicle frame components 24, but these will not be discussed further. FIG. 2 also reveals an outer end face 26 of an axle of the wheel, which axle is pushed through the outer frame section 18, the wheel 16 and the inner frame section 20. Here, the outer face 28 of the outer frame section 18 and the outer end face 26 of the axle form a smooth external contour without projecting components.

Figure 3:
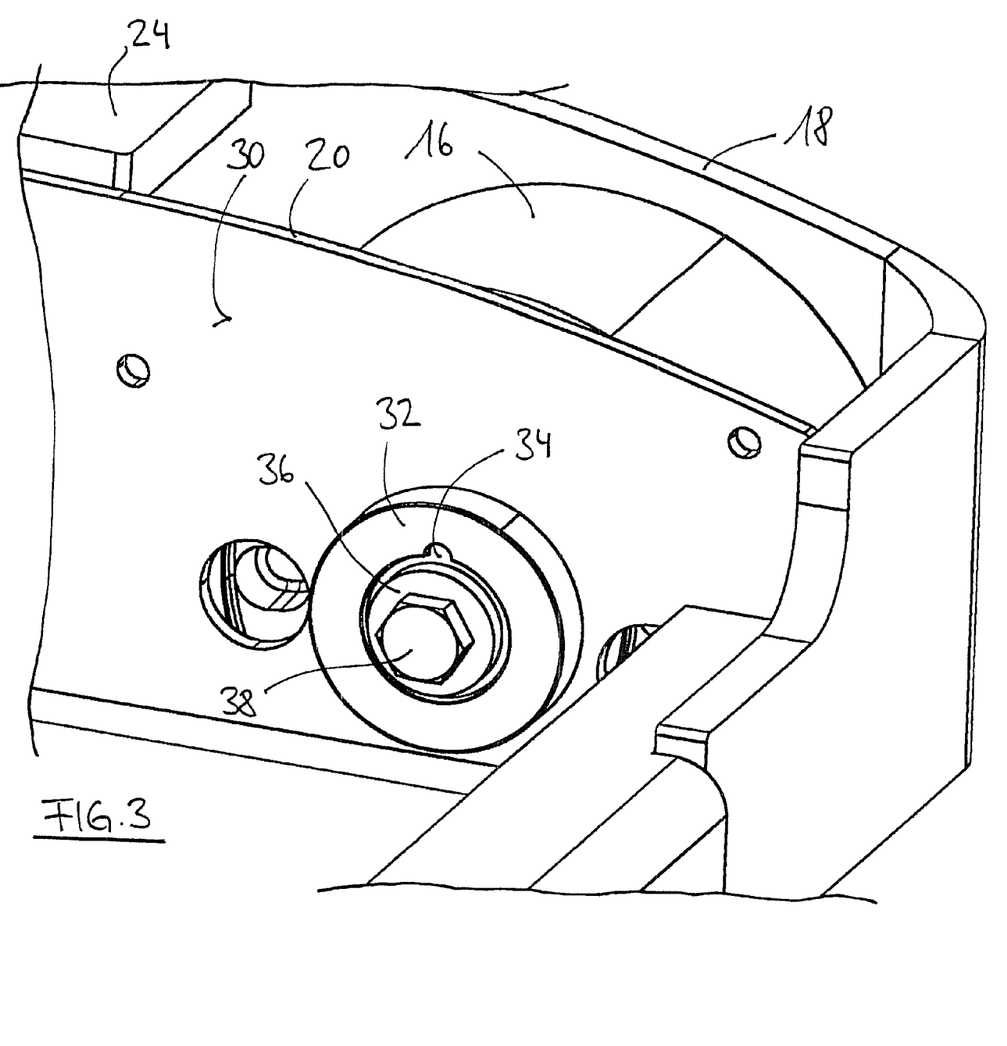
FIG. 3 is an enlarged perspective partial view of the front left wheel from the inside.

FIG. 3 is a schematic perspective illustration on an enlarged scale corresponding to the arrow III in FIG. 2. The inner face 30 of the inner frame section 20 can be seen, on which the wheel axle is supported and fixed by means of a bush 32, a plurality of ring elements or compensating washers 34, a thrust washer 36 and a screw 38. From the combined view of FIG. 2 and FIG. 3 it becomes clear that the axle of the wheel 16 is screwed only to the inner side of the industrial truck or the inner frame section 20. This point is very easily accessible during the mounting of the wheel on the industrial truck, which simplifies the mounting overall.

Figure 4:
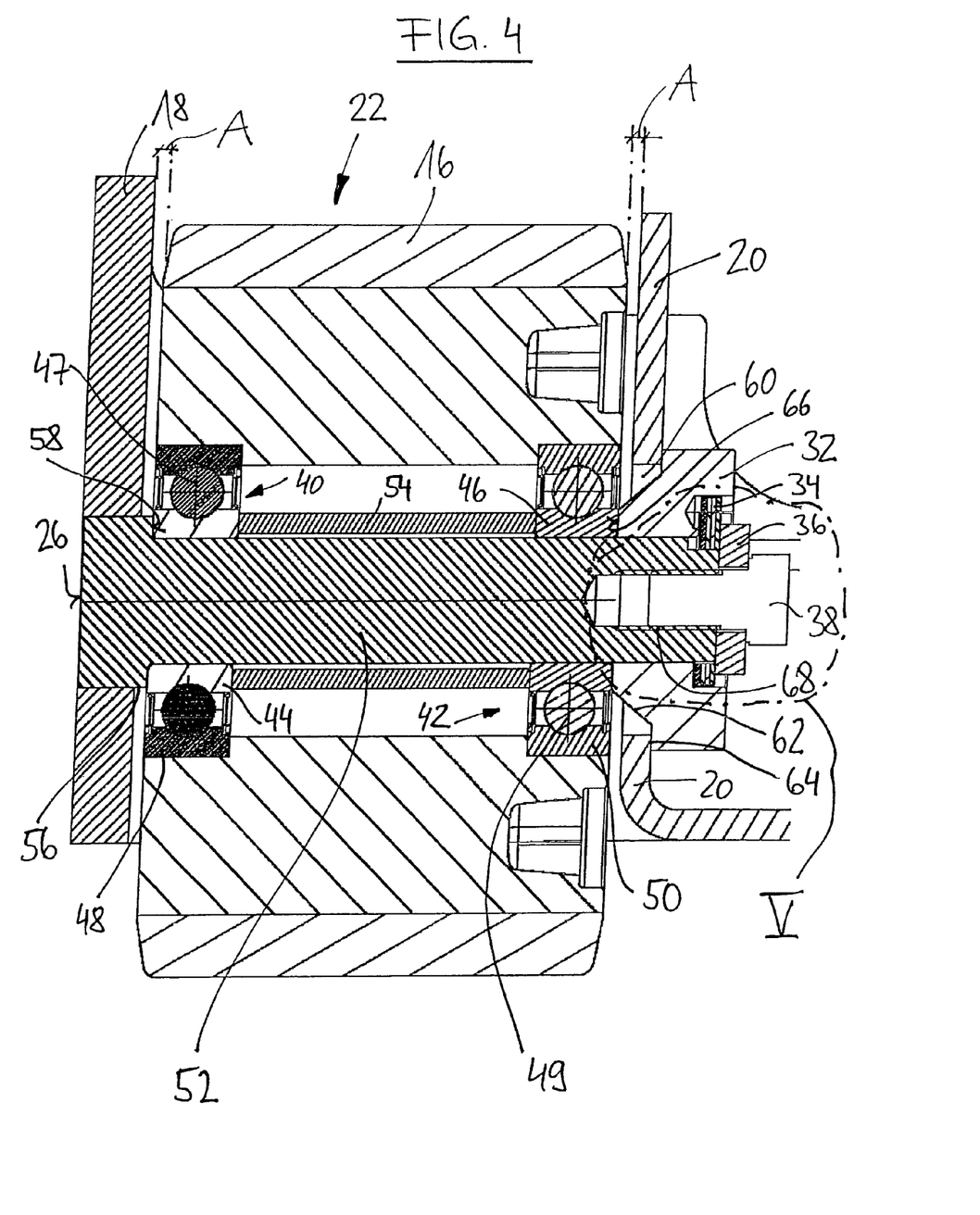
FIG. 4 is a cross-sectional illustration corresponding to the section line IV-IV in FIG. 2.

The detailed structure of the fixing arrangement for the fixing of the wheel 16 between the two frame sections 18, 20 and to the industrial truck 10 can be seen from the cross-sectional illustration of FIG. 4, which illustrates a section corresponding to the line IV-IV from FIG. 2. The wheel 16 is arranged between the outer frame section 18 and the inner frame section 20, having an axial spacing A in relation to each frame section 18, 20, so that the wheel 16 does not rub on the frame sections 18, 20. Although the respective spacings from the frame section 18, 20 are designated here by the same letter A, this does not mean that these spacings necessarily have to be identical. It is possible for these spacings to be different because of fabrication tolerances or as necessitated by the design.

The wheel 16 has an outer ball bearing 40 and an inner ball bearing 42 each having an inner bearing shell 44 and 46, an outer bearing shell 48 and 59 and balls 47 and 49 held between these. A spacer bush 54 extends in the axial direction between the inner bearing shells 44 and 46 resting on the axle 52.

At its outer end, the axle 52 has a radial projection 56, on whose radial annular face 58 the inner bearing shell 44 of the outer ball bearing 40 rests. The radial projection 56 has an extent in the axial direction which is larger than the axial thickness of the frame section 18, so that, on account of the protrusion of the radial projection 56 into the interspace 22, the spacing A between the wheel 16 and the outer frame section 18 is formed. The axle 52 extends from its front end 26 through the interspace 22, the wheel 16 and the inner frame section 20. The inner frame section 20 has an opening 60, through which a conical section 62 of the bush 32 passes. In this case, the bush 32 is supported on the frame section 20 in the axial direction by an annular section 64 adjoining the conical section 62. The conical configuration of the bush 32 makes it possible for the inner ball bearing 42 to rest only with its inner bearing shell 46 on the end face 66 on the wheel side of the bush 32. The annular section 64 is welded to the frame section 20, so that the bush 32 is secured against axial and rotary movements.

The wheel 16 or its wheel bearing arrangement 40, 42 is thus held between the radial projection 56 of the axle 52 and the bush 32.

In order to mount the wheel 16 in the interspace 22 between the two frame sections 18, 20 in the axial direction without play, the bush 32 is clamped against the inner bearing shell 46 of the ball bearing 42 by means of the screw 38 inserted into the axle 52, the forces applied by the screw 38 being transferred to the bush 32 via the thrust washer 36 and the ring elements 34 and being supported via the spacer bush 54, the inner bearing shell 44 of the ball bearing 40 and the radial projection 56 of the axle 42. In this way, the wheel 16 is clamped axially without play between the projection 56 of the axle 52 and the bush 32. The screw 38 is screwed into the axle 52 in a hole 68 which is concentric in the exemplary embodiment, it also being conceivable to provide screw connections arranged or configured in other ways.

Figure 5:
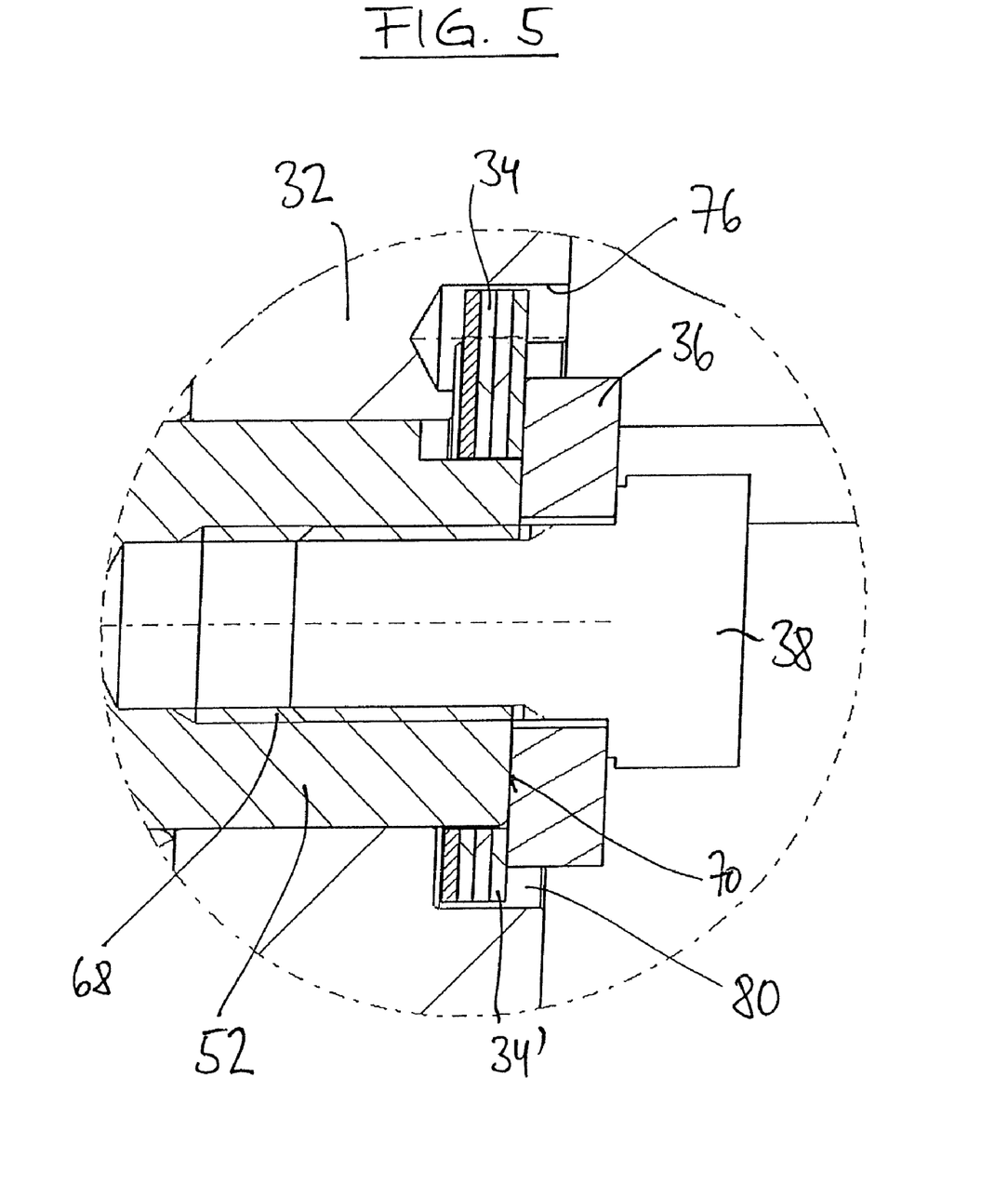
FIG. 5 is an enlargement of the region V from FIG. 4.

An enlarged cross-sectional illustration of the fixing region between axle 52 and bush 32 can be seen from FIG. 5. This illustration reveals that the annular washers 34 are flush in the axial direction with an annular end face 70 of the axle 52, so that the thrust washer 36 rests both on this end face 70 and on one of the ring elements 34'. Such a flush contact between ring elements 34, axle 52 and thrust washer 36 constitutes one possible case. However, on account of fabrication tolerances it is frequently the case that the ring element 34' projects beyond the end face 70 of the axle 52 in the axial direction toward the compression ring 36, so that the compression ring 36 does not load the end face 70 of the axle 52. A small spacing formed in this way between the compression ring 36 and the end face 70 of the axle 52 does not impair the axial fixing of the axle 52, however, since it is fixed axially via the form fit comprising the screw 38, thrust washer 36, ring elements 34 and bush 32 fixed to the frame section 20, so that axial loading between compression ring 36 and axle 52 is not required.

Figure 6:
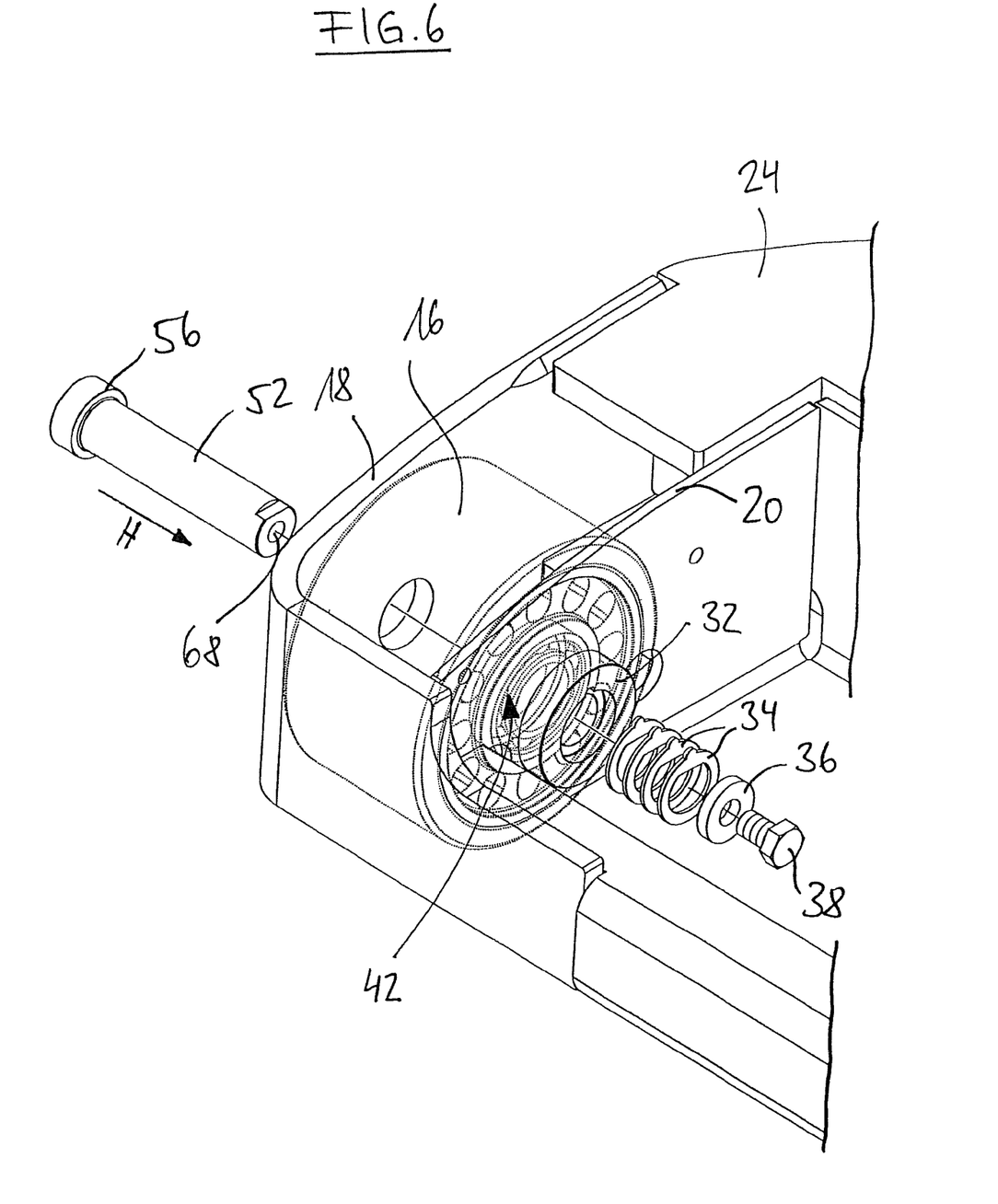
FIG. 6 is a perspective exploded illustration of a fixing arrangement using the example of a front right wheel of the industrial truck.

FIG. 6 shows the fixing arrangement described as an exploded illustration, this time for the right wheel 16. For simplicity, the same reference symbols have also been used in this figure. During the mounting of the wheel 16 on the order picking truck 10, firstly the wheel 16 is introduced in between the two frame sections 18, 20 until the inner bearing shells 40, 46 are substantially aligned with the openings in the frame sections 18, 20, so that the axle 52 can be pushed through from the outside through the wheel 16 and the bush 32 already welded to the frame section 20 (direction H). The wheel 16 is then already adequately secured for mounting purposes and, one after another, a number of ring elements 34 needed for the axially play-free fixing of the wheel 16, the thrust washer 36 and the screw 38 can be pushed onto the axle 52 or screwed into the latter from the inner side.

Figures 7, 8:
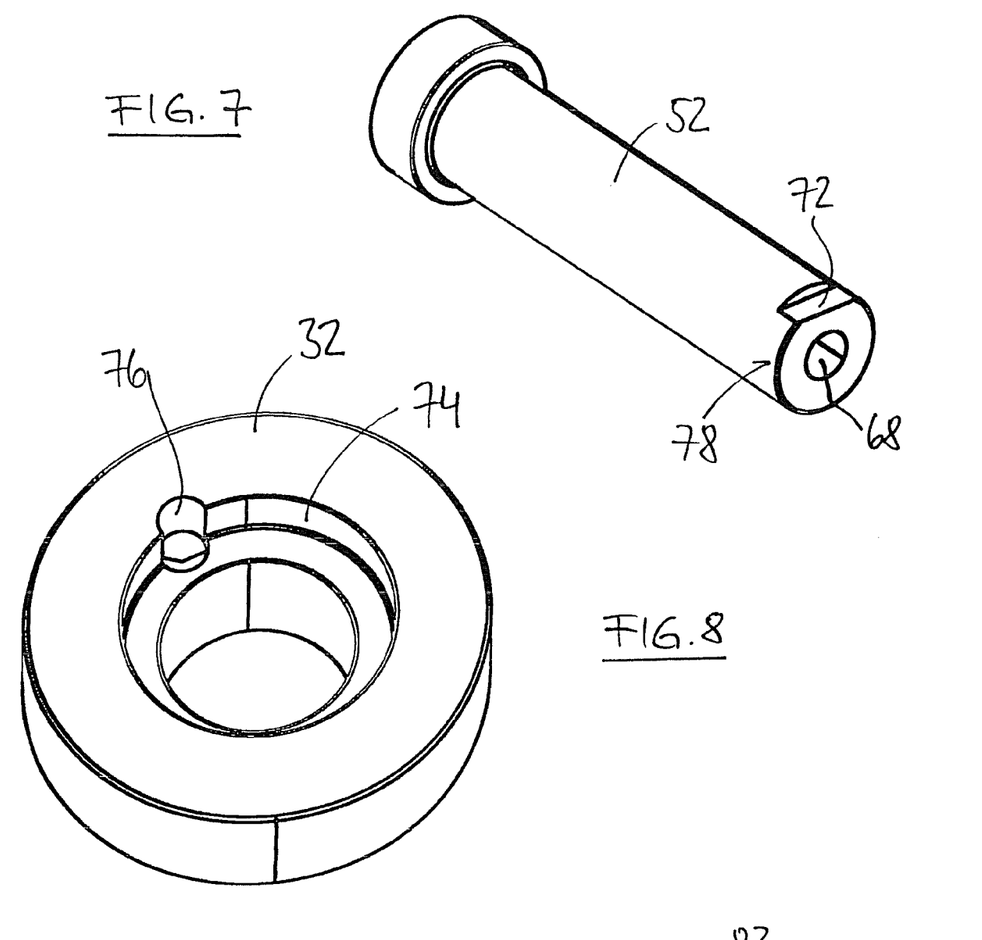
FIG. 7 is a perspective illustration of an axle.
FIG. 8 is a perspective view of a bush.

As has already been mentioned at the beginning, not only must the axle 52 be fixed axially but it is also necessary to prevent the axle 52 rotating relative to the vehicle frame. For this purpose, at its end on the bush side, the axle 52 has a flattened, preferably flat, outer circumferential section 72 (FIG. 7), and the bush 32 has a step-like radial widening 74 (FIG. 8), in which a recess 76 is formed radially on the outside. When the axle 52 is inserted into the bush 32, between the radial widening 74 and the outer circumference 78 of the axle 52 there is formed an annular holder 80 (FIG. 5), into which the ring elements 34 are inserted.

Figure 9:
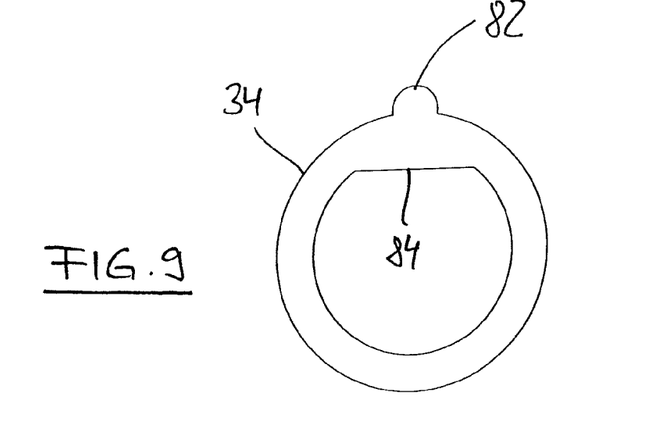
FIG. 9 is a plan view of a ring element that can be inserted into the bush of FIG. 8.

In order that the anti-rotation securing of the axle 52 is achieved, the ring elements 34, as illustrated in FIG. 9, are formed so as to be complementary to the inner circumference of the bush 32 and complementary to the outer circumference of the axle 52, the ring element 34 having on its outer circumference a radial projection 82 which is in engagement with the radial recess 76, and having on its inner circumference a flattened anti-rotation section 84, which rests on the flattened outer circumferential section 52 of the axle. In this way, the ring elements 34 are used not only to compensate for fabrication tolerances for the axially play-free mounting of the wheel 16 but, at the same time, they permit the rotationally fixed support of the axle 52 with respect to the bush 32 and with respect to the frame sections 18, 20. Compensating for play by means of the ring elements 34 in the fixing arrangement presented is displaced into an easily accessible region and it is particularly advantageous that the ring elements 34 have to be pushed onto the axle 52 from only one side. The spacing A between the wheel 16 and the frame sections 18, 20 is achieved by the suitable dimensioning of the radial projection 56 of the axle 52 and the bush 32, so that no further compensating washers have to be pushed onto the axle 52 between the frame sections 18, 20 and the wheel 16. This simplifies the mounting of a wheel by means of the plug-in axle 52 considerably.

In summary, therefore, the wheel 16 is fixed axially via the form fit comprising the bush 32, inner bearing shell 46 of the ball bearing 42, spacer bush 54, inner bearing shell 44 of the ball bearing 40 and the radial projection 56 of the axle 52. The axle 52 is fixed axially via the form fit comprising the screw 38, thrust washer 36, ring elements and compensating washers 34 and bush 32. Fabrication tolerances can be compensated for by the compensating washers 34, and the mounting can be set so as to be play-free. Furthermore, by means of the form fit at the bush-side end of the axle 52, between the axle 52, the ring elements and compensating washers 34 and the bush 32, rotation of the axle 52 is prevented. The result overall is a fixing arrangement comprising few components for a wheel, the mounting of which can be carried out simply and quickly.

The invention claimed is:

1. Vehicle having at least one non-driven wheel located between an outer and an inner frame section of the vehicle, and capable of rotating about an axle supported with respect to these frame sections, wherein the axle is arranged to be fixed against rotation and axially non-displaceable with respect to the frame sections, and the wheel has a wheel bearing arrangement which is arranged substantially without free play on the axle in such a way that the wheel is arranged with a respective spacing in the axial direction from the frame sections, the wheel bearing arrangement is clamped in between a radial projection formed at one end of the axle and a fixing arrangement fitted to the other end of the axle, the fixing arrangement comprises a bush arranged concentrically around the other end of the axle, and the axle is held non-displaceably in the axial direction with respect to the frame sections by means of the bush, the wheel bearing arrangement and the radial projection.

2. Vehicle according to claim 1, wherein the bush has a conical section which, for the purpose of axial support of the wheel bearing arrangement, passes through an opening in the frame section, and the bush is supported axially on the frame section.

3. Vehicle according to claim 1, wherein, in the region of the other end of the axle, on the bush side, the bush has a step-like radial widening, in such a way that, in the region of the widening, between the outer circumference of the axle and the inner circumference of the bush, a substantially annular holder is formed.

4. Vehicle according to claim 3, wherein the bush has at least one recess formed radially on the outside on the inner circumference in the region of the widening.

5. Vehicle according to claim 3, wherein, at its end on the bush side, the axle has at least one flattened outer circumferential section located in the region of the widening of the bush.

6. Vehicle according to claim 5, wherein the fixing arrangement has at least one disc-like ring element which is complementary to the inner circumference of the bush and to the outer circumference of the axle and which is inserted into the annular holder.

7. Vehicle according to claim 6, wherein the bush has at least one recess formed radially on the outside on the inner circumference in the region of the widening, and the ring element has at least one radial projection on its outer circumference, which is in engagement with the at least one radial recess on the inner circumference of the bush, and has on its inner circumference a flattened anti-rotation section, which rests on a flattened outer circumferential section of the axle.

8. Vehicle according to claim 1, wherein the bush is firmly connected to the frame section.

9. Vehicle according to claim 8, wherein the bush is welded to the frame section.

10. Vehicle according to claim 1, wherein, at its end on the bush side, the axle has at least one flattened outer circumferential section.

11. Vehicle according to claim 10, at its end on the bush side, the axle having at least one flat outer circumferential section.

12. Vehicle according to claim 1, wherein the bush and the axle are fixed to each other by means of a screw connection belonging to the fixing arrangement.

13. Vehicle according to claim 12, wherein the screw connection comprises a screw connecting the axle to the bush and at least one ring element, which is inserted into a concentric axial hole at the bush-side end of the axle.

14. Vehicle according to claim 13, wherein the fixing arrangement comprises a thrust washer which is arranged axially between the bush and the screw head of the screw and which provides the axial support for the at least one ring element.

15. Vehicle according to claim 1, wherein the axle is held with its radial projection in a corresponding opening in one of the frame sections.

16. Vehicle according to claim 15, wherein the radial projection is substantially flush with the outer side of the one of the frame sections facing away from the wheel, and these together form a smooth external contour of the vehicle.

17. Vehicle according to claim 16, wherein the one of the frame sections is the outer frame section.

18. Vehicle according to claim 1, wherein the wheel bearing arrangement has a first wheel bearing resting on the radial projection of the axle and a second wheel bearing resting on the bush, between which in the axial direction a concentric spacer bush is arranged.

19. Vehicle according to claim 1, wherein the vehicle is an industrial truck.

20. Fixing arrangement for a non-driven wheel on a vehicle, the fixing arrangement comprising:
   an axle, which is capable of being introduced into a wheel bearing arrangement of the wheel, and
   fixing means by means of which the axle is fixed to the vehicle so that it is axially non-displaceable, the fixing means having:
      a bush that is capable of being plugged onto one end of the axle and
      at least one ring element, which is capable of being introduced into a holder formed between the outer circumference of the axle and the inner circumference of the bush in the region of the one axle end,
   wherein said non-driven wheel is capable of rotating about the axle, the axle is supported with respect to inner and outer frame sections, the axle is arranged to be fixed against rotation and axially non-displaceable with respect to the frame sections, and the wheel has the wheel bearing arrangement which is arranged substantially without free play on the axle in such a way that the wheel is arranged with a respective spacing in the axial direction from the frame sections, wherein the wheel bearing arrangement is clamped in between a radial projection formed at the other end of the axle and the fixing means fitted to the one end of the axle, the bush is arranged concentrically around the one end of the axle, and the axle is held non-displaceably in the axial direction with respect to the frame sections by means of the bush, the wheel bearing arrangement and the radial projection.

21. Fixing arrangement according to claim 20, wherein the vehicle is an industrial truck.

* * * * *